M. J. FARQUHAR.
ELECTRIC SEAM WELDING.
APPLICATION FILED MAY 14, 1909.

1,000,967.

Patented Aug. 15, 1911.

WITNESSES
Harry King
Joseph C. Stack

INVENTOR
Milton J. Farquhar
By Julian C. Dowell
his Attorneys.

UNITED STATES PATENT OFFICE.

MILTON J. FARQUHAR, OF WILMINGTON, OHIO, ASSIGNOR TO FARQUHAR FURNACE COMPANY, OF WILMINGTON, OHIO, A CORPORATION OF OHIO.

ELECTRIC SEAM-WELDING.

1,000,967.  Specification of Letters Patent.  Patented Aug. 15, 1911.

Application filed May 14, 1909. Serial No. 495,988.

*To all whom it may concern:*

Be it known that I, MILTON J. FARQUHAR, a citizen of the United States, residing at Wilmington, in the county of Clinton and State of Ohio, have invented certain new and useful Improvements in Electric Seam-Welding; and I do hereby declare the following to be a full, clear, and exact description of the invention, such as will enable others skilled in the art to which it appertains to carry out the same.

My invention relates to the art of welding metal plates, sheets, skelp and the like by the electric welding process, and particularly to welding the elongated joints or seams of tubular and box-like objects, including both the longitudinal seams and the circumferential seams where the heads of such articles are joined to the bodies thereof.

The invention is especially useful in the production of welded seams where the parts to be welded together meet at an angle, and provides a process applicable to certain structures and portions of structures wherein the seams cannot conveniently, practicably or effectively be welded by ordinary and previously known methods; as, for example, at the angles between the ends and heads of box-like structures and especially at the corners between three sides of such structures.

With my present method, it is entirely practicable to weld a completely closed box with the seams at the corners and angles as perfect as elsewhere. The use of mandrels to maintain the form of the work is unnecessary.

The invention is based partly upon the principle of effecting the union of metal by the passage of an electric current of sufficient volume through the joint, and partly upon the principle or fact that the production of vibrations in metal heated to the point of fusion or proper plasticity for union will so affect its molecular structure as to result in homogeneity of the mass; and my method involves essentially the passing of the welding current across the joint and progressively along the joint, and concurrently applying repeated light impacts upon the joint at or approximate to the passage of the current and progressively along the joint with the progression of the current. This operation is comparatively rapid and results in the metal becoming thoroughly united as it passes from the region of impact. The operation may be figuratively compared with that of machine stitching; the longitudinally progressing current taking the place of the thread, and the function of the hammer corresponding to that of the needle which makes the thread effective.

The principal objects attained by my invention are the practicability, convenience, efficacy and comparative rapidity of the process; its applicability to seam welding at angles and corners which are not accessible to ordinary welding instrumentalities; and the superiority of the welded joint in form, homogeneity and strength.

The work being properly arranged with the adjacent or approximating edges of the skelp or metal plates or sheets in the position in which they are to be joined, and held fast in that relation by any appropriate mechanical devices, the welding process according to my invention is or may be carried out by means of electrodes in sliding or rolling contact with the work at opposite sides of the joint, or at or near the respective meeting edges, and included in an electrical circuit for supplying a heating or welding current of large volume but comparatively low electro-motive force which in passing through the joint will heat the same locally to the proper plasticity for union; in conjunction with a repeating hammer or hammers adapted and arranged to deliver a quick succession of light impacts upon the joint at the point of localized heat, operating upon the metal at or near and concurrently with the passage of the current, to assist in the consolidation and shaping of and to complete the weld; the work being continuously moved in the longitudinal direction of the joint, relative to the electrodes and hammer, at about the rate of one foot per minute for welding the edges of plates of three-sixteenths of an inch thickness, or more or less, depending upon conditions; or, vice versa, the electrodes and hammer being moved longitudinally of the work in the same manner.

I prefer to have the hammer follow the current and operate as closely behind the electrodes as possible, because of the fact, as I have observed from experiment, that the metal attains its critical fusion point not at the instant of passing of the current, but the instant after the current has passed. I do not, however, confine myself to said arrangement, for in some cases I apply the impacts coincidently with the points of contact of the electrodes, or send the current through the same portion of the joint upon which the impacts are falling.

Except as above stated, my method is not dependent upon any particular apparatus other than such electrical and mechanical appliances as will be understood by those familiar with the art. A carriage is of course employed for feeding the work, where the electrodes and hammer have a fixed location, in order to effect the progressive operation of the current and impacts along the line of the joint; and clamps or other suitable contrivances are or may be used for maintaining the abutting or adjacent edges of the work in proper position. The hammer, which may be driven electrically, pneumatically, mechanically, or otherwise, may reciprocate in a guide having a fixed relation to the electrodes to direct the hammer upon the work in proper relation to the current; and it may be stated that I prefer to employ a hammer having a cushioned stroke, or driven through the medium of a spring or other yieldable means in order to deliver yielding blows upon the work. The source of electricity which heats the metal to a welding temperature may be of any desired character. Preferably a transformer is employed for converting a high-tension current into a heavy current of low voltage and great heating power; the secondary conductor being connected to the electrodes.

The face of the hammer may be formed to shape the weld; and for welding the meeting edges of skelp or plates or sheets at an angle, I employ preferably a single hammer operating obliquely to the plates, usually substantially in the line of bi-section of the angle, and exteriorly of the angle, and having a concaved or a V-shaped head adapted to pass over the joint at each stroke and round off the weld; or I may employ two or more hammers operating at opposite sides of the joint and at right angles to the respective plates or such other angles as may be appropriate according to conditions.

The especial advantage of the method in welding corner and angular seams arises from the fact that the operation may be conducted wholly exteriorly of the work; the electrodes being applied to the outer sides of the skelp or plates and the hammer operating upon the external side of the joint and thus coöperating with the current to effect, consolidate and shape the weld; and the use of an internal mandrel being unnecessary as the blows of the hammer are directed upon and sustained by the ridge formed by the angular juncture of the metal parts.

Having now explained my invention, I will refer to the accompanying drawings, wherein I have illustrated diagrammatically several ways and means of carrying out the same.

Figure 1 is a diagrammatic front view of one form of apparatus. Fig. 2 is a side view of the same. Fig. 3 is a cross section of the weld. Fig. 4 is a view similar to Fig. 1 showing the use of an insert between the adjacent edges of the skelp. Fig. 5 is a diagrammatic front view of another form of apparatus. Fig. 6 is a side view of the same. Fig. 7 is a front view of still another form of apparatus. Fig. 8 is a cross section of the weld produced by the operation of Fig. 7. Fig. 9 is a front view of a different form of apparatus. Fig. 10 is a front sectional view of still another form of apparatus.

$x$ and $y$ indicate the metal plates, sheets, strips or parts of the skelp that are to be welded together, shown in cross-section in the drawings except in Figs. 2 and 6.

$a$ and $b$ denote the electrodes or circuit terminals for the welding current, the conductor of which may be the secondary from a transformer.

$c$ indicates the hammer or hammers.

In Figs. 1 to 6 inclusive, the electrodes consist of bars or rods of good conducting material, preferably copper, in sliding contact with the edge portions of the respective plates, for sending the welding current across the joint. The work is supposed to be movable in the direction of the arrow in Figs. 2 and 6. Thus, in Figs. 1, 4, 5, 7, 9 and 10, the work is moving toward the observer. While with relation to the progress of the work the hammer follows the electrodes, yet in each of the figures, the hammer appears in front of the electrodes, the working being movable in the direction indicated, and the work being supposed to move toward the observer in Figs. 1, 4, 5, 7, 9 and 10.

Figs. 1 and 2 show the use of a single hammer arranged intermediately of and just behind the electrodes, and operating upon the ridge formed by the meeting of the plates at an angle; the face of the hammer being concave to swage the corners of the plates and round off the weld. The joint between the meeting edge portions of the plates may be of various kinds; for example, the edges of the plates may be beveled to form a butt-joint, or the edges may be squared and placed in contact at the inner corner; but I prefer the arrangement shown in Fig. 1, wherein the edge portion of one plate partially overlaps the edge of the other plate. It is also preferable that the electrodes should contact with the sides of the plates a short distance from the edge, whereby the current more completely and uniformly heats the edge portions between the electrodes. The arrangement shown in Fig. 1, where each electrode contacts with its plate at a distance from its edge equal to about the thickness of the plate, and where the plate $x$ overlaps the plate $y$ for about two-thirds the thickness of the latter, gives the most satisfactory results.

Figure 1:
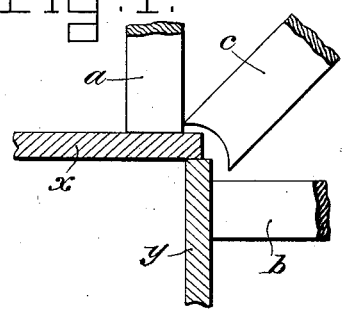
Figure 2:
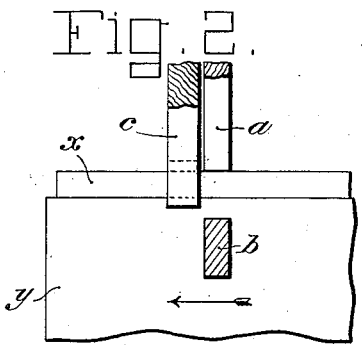
Figure 3:
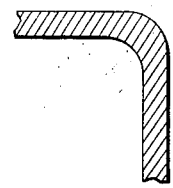
Figure 4:
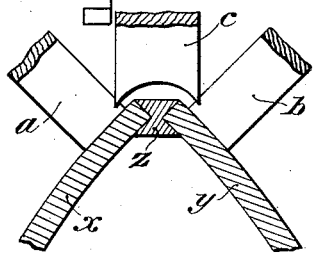
Fig. 4 shows an arrangement substantially similar to Fig. 1, but illustrates the use of an insert $z$ at the ridge between the adjacent edges of the plates $x$ and $y$; said insert being a metal strip capable of uniting with the plates by welding. The use of an insert is unnecessary, but it may be used if desired.
Figure 5:
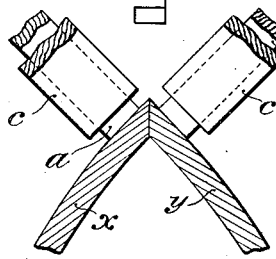
Figs. 5 and 6 show the plates $x$ and $y$ having beveled meeting edges forming a butt joint, and represent the use of a pair of hammers following the respective electrodes at opposite sides of the joint.
Figure 6:
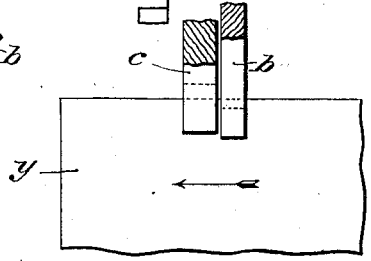

Where the hammer operates directly upon the ridge, as in Figs. 1 and 4, its impacts are taken by the plates in the direction of the legs of the angle; and where two hammers operate upon opposite sides of the ridge, as in Fig. 5, the blow is received at the butt joint and the hammers oppose one another, so that the work sustains itself against the impacts of the hammer and the use of an internal mandrel is unnecessary; it being understood of course that the light impacts produced by the hammer are not of such force as to pound or deform the work, but only such as to consolidate and shape the welding of the plastic metal. Both electrodes, as well as the hammer, being applied exteriorly of the angle, it will be seen that the welding operation may be very easily performed on seams at angles, corners, or other places where access for welding instrumentalities would ordinarily be difficult. Considering $x$ and $y$ in Figs. 1 and 2 as the head and body respectively of any tubular or box-like structure, it is obvious that the work may be moved or turned to progress the joint between the electrodes and under the hammer until the complete circumferential joint or seam between the head and body is welded; whereupon the body may be inverted, and the opposite head welded thereto in like manner. In its broad aspect, however, my invention does not exclude the use of a mandrel, nor do I confine myself to application of the elctrodes exteriorly of the angle, since it may be practicable in some cases to apply one or both electrodes to the inner sides of the plates. I have illustrated the use of a mandrel in Figs. 7 and 9, applied to the operation of welding light sheet metal.

Figure 7:
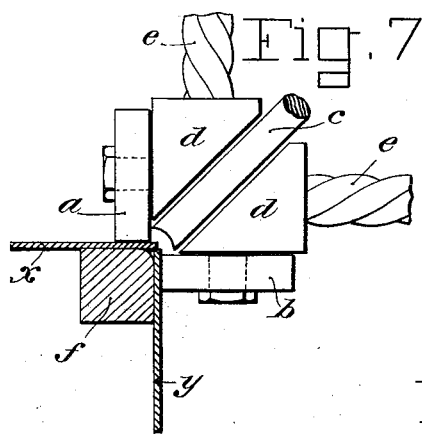
Figure 8:
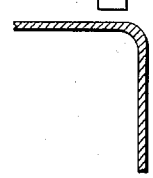

In Fig. 7, the electrodes $a$ and $b$ consist of rollers in contact with the edge portions of the respective plates, and the hammer C is arranged intermediately and operates upon the ridge. $d$ indicates brackets supporting the axles of the rollers and included in the welding circuit, the conductor of which is indicated at $e$. $f$ indicates the mandrel. The joint of the sheet metal plates is heated between the electrodes, thence passes under the hammer which welds and shapes the same like Fig. 8.

Figure 9:
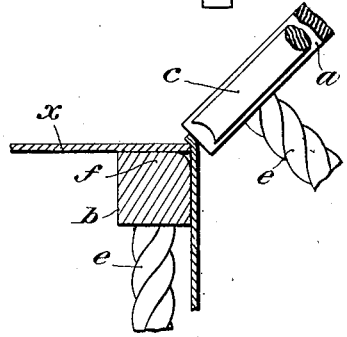

Fig. 9 shows the mandrel $f$ employed as the electrode $b$, as appears from the connection of the conductor $e$ to the mandrel. On the outside of the joint is the other electrode $a$ in sliding contact and followed by the hammer $c$. In this view, the edge of one plate is shown projecting beyond the edge of the other plate, and is bent over by the operation of the hammer.

Figure 10:
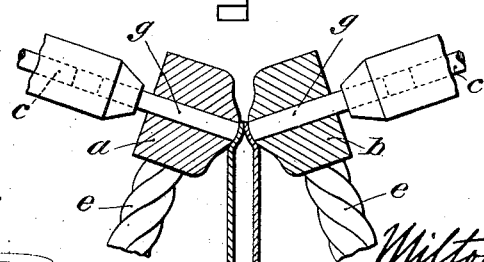

In Fig. 10, the electrodes $a$ and $b$ consist of blocks of good conducting material, preferably copper, inclosing steel tools $g$, upon which the hammers $c$ operate, so that the impacts are produced in this case upon the local point through which the current is passing. This apparatus is shown applied to welding the edges of spaced sheet metal plates, the upper portions of which are bent over and brought together. In this view the hammers are pneumatically operated.

Having thus described my invention what I claim is:

1. The method of welding adjacent edges of metal plates at an angle, which consists in sending an electric welding current through and progressively along the ridge joint, and applying a quick succession of light impacts upon the ridge, in proximity to and progressively with the current.

2. The method of welding adjacent edges of metal plates at an angle, which consists in sending an electric welding current transversely through and progressively along the ridge joint, and applying a quick succession of light impacts upon the ridge by means operating closely behind and progressing with the current, whereby such impacts are effective at the instant of the critical fusion point of the metal.

3. The method of welding adjacent edges of metal plates at an angle, which consists in sending an electric welding current transversely through and progressively along the ridge joint and applying a quick succession of light impacts externally upon the ridge, at or near the region of the current and progressively therewith, by hammering means adapted to shape the weld and arranged so that the work sustains itself against such impacts.

4. The method of welding adjacent edges of metal plates at an angle, which consists in sending an electric current transversely through the joint and progressively along the joint at the edge portions of the respective plates on the outside of the angle included between the plates, and progressively hammering upon the ridge between said plates.

5. The method of welding adjacent edges of metal plates at an angle, which consists in sending an electric current transversely through the joint and progressively along the joint and applying a succession of light impacts behind and progressively with the current upon the ridge at the said adjacent edges of the plates.

6. The method of welding adjacent edges of metal plates at an angle, which consists in partially lapping the edge of one plate by the edge portion of another plate, passing an electric current locally through the meeting edge portions of the plates and progressively along the joint, and hammering the outer side of the joint behind and progressively with the current.

In testimony whereof I affix my signature, in presence of two witnesses.

MILTON J. FARQUHAR.

Witnesses:
   MELVILLE HEYER,
   NATHAN M. LINTON.